US009158691B2

(12) United States Patent
Saund et al.

(10) Patent No.: US 9,158,691 B2
(45) Date of Patent: *Oct. 13, 2015

(54) CROSS DEPENDENCY CHECKING LOGIC (71) Applicant: Apple Inc., Cupertino, CA (US)

(72) Inventors: Gurjeet S. Saund, Saratoga, CA (US);
Harshavardhan Kaushikkar, San Jose, CA (US)

(73) Assignee: Apple Inc., Cupertino, CA (US)

( * ) Notice: Subject to any disclaimer, the term of this patent is extended or adjusted under 35 U.S.C. 154(b) by 365 days.

This patent is subject to a terminal disclaimer.

(21) Appl. No.: 13/715,623

(22) Filed: Dec. 14, 2012

(65) Prior Publication Data
US 2014/0173218 A1 Jun. 19, 2014

(51) Int. Cl.
| G06F 12/00 | (2006.01) |
| G06F 13/00 | (2006.01) |
| G06F 13/28 | (2006.01) |
| G06F 12/08 | (2006.01) |

(52) U.S. Cl.
CPC ........ G06F 12/0828 (2013.01); G06F 12/0822 (2013.01)

(58) Field of Classification Search
None
See application file for complete search history.

(56) References Cited

U.S. PATENT DOCUMENTS

| 4,538,266 | A |   | 8/1985  | Miki |
| 5,317,711 | A |   | 5/1994  | Bourekas et al. |
| 5,561,780 | A |   | 10/1996 | Glew et al. |
| 5,630,075 | A |   | 5/1997  | Joshi et al. |
| 5,655,096 | A | * | 8/1997  | Branigin ............... 712/200 |
| 5,664,148 | A |   | 9/1997  | Mulla et al. |
| 5,666,506 | A |   | 9/1997  | Hesson et al. |
| 5,754,812 | A |   | 5/1998  | Favor et al. |
| 5,781,752 | A |   | 7/1998  | Moshovos et al. |
| 5,826,089 | A | * | 10/1998 | Ireton ................... 712/209 |
| 5,832,297 | A |   | 11/1998 | Ramagopal et al. |
| 5,918,072 | A |   | 6/1999  | Bhattacharya |
| 6,032,225 | A |   | 2/2000  | Shiell et al. |
| 6,108,770 | A |   | 8/2000  | Chrysos et al. |
| 6,131,155 | A |   | 10/2000 | Alexander et al. |
| 6,173,368 | B1|   | 1/2001  | Krueger et al. |

(Continued)

FOREIGN PATENT DOCUMENTS

| WO | 01/50252   | 7/2001 |
| WO | 2006/028555| 3/2006 |

OTHER PUBLICATIONS

Bruce Jacob et al. Memory Systems: Cache, DRAM, Disk, pp. 240-256, 2008.*

(Continued)

Primary Examiner — Cheng-Yuan Tseng
Assistant Examiner — Rocio Del Mar Perez-Velez
(74) Attorney, Agent, or Firm — Rory D. Rankin; Meyertons, Hood, Kivlin, Kowert & Goetzel, P.C.

(57) ABSTRACT

Systems and methods for maintaining an order of transactions in the coherence point. The coherence point stores attributes associated with received transactions in an input request queue (IRQ). When a new transaction is received by the coherence point, the IRQ is searched for other entries with the same request address or the same victim address as the new transaction. If one or more matches are found, the new transaction entry points to the entry storing the most recently received transaction with the same address. The new transaction is stalled until the transaction it points to has been completed in the coherence point.

21 Claims, 7 Drawing Sheets

(56) References Cited

U.S. PATENT DOCUMENTS

| | | | |
|---|---|---|---|
| 6,178,467 B1 | 1/2001 | Faucher et al. | |
| 6,205,517 B1 | 3/2001 | Sugaya | |
| 6,219,745 B1 | 4/2001 | Strongin et al. | |
| 6,223,258 B1 | 4/2001 | Palanca et al. | |
| 6,249,851 B1 | 6/2001 | Richardson et al. | |
| 6,266,767 B1 * | 7/2001 | Feiste et al. | 712/217 |
| 6,334,171 B1 | 12/2001 | Hill et al. | |
| 6,366,984 B1 | 4/2002 | Carmean et al. | |
| 6,425,023 B1 | 7/2002 | Batchelor et al. | |
| 6,571,318 B1 | 5/2003 | Sander et al. | |
| 6,658,554 B1 | 12/2003 | Moshovos et al. | |
| 6,725,358 B1 * | 4/2004 | Moore | 712/216 |
| 6,728,866 B1 * | 4/2004 | Kahle et al. | 712/215 |
| 7,181,598 B2 * | 2/2007 | Jourdan et al. | 712/217 |
| 7,206,865 B2 | 4/2007 | Creta et al. | |
| 7,320,063 B1 * | 1/2008 | Grohoski et al. | 712/214 |
| 7,492,368 B1 | 2/2009 | Nordquist et al. | |
| 2002/0147869 A1 * | 10/2002 | Owen et al. | 710/105 |
| 2002/0178349 A1 | 11/2002 | Shibayama et al. | |
| 2003/0126409 A1 | 7/2003 | Juan et al. | |
| 2003/0217251 A1 | 11/2003 | Jourdan et al. | |
| 2004/0186965 A1 | 9/2004 | Yap et al. | |
| 2005/0193041 A1 * | 9/2005 | Bourbonnais et al. | 707/204 |
| 2006/0106987 A1 * | 5/2006 | Barrick et al. | 711/125 |
| 2006/0143402 A1 | 6/2006 | Chennupaty et al. | |
| 2006/0271767 A1 * | 11/2006 | Osanai et al. | 712/216 |
| 2007/0011378 A1 | 1/2007 | Gaskins | |
| 2007/0074005 A1 * | 3/2007 | Abernathy et al. | 712/214 |
| 2007/0079044 A1 | 4/2007 | Mandal et al. | |
| 2007/0226470 A1 | 9/2007 | Krimer et al. | |
| 2008/0109624 A1 * | 5/2008 | Gilbert et al. | 711/163 |
| 2009/0083263 A1 | 3/2009 | Felch et al. | |
| 2010/0205384 A1 | 8/2010 | Beaumont-Smith et al. | |
| 2010/0250902 A1 * | 9/2010 | Abernathy et al. | 712/216 |
| 2010/0293347 A1 | 11/2010 | Luttrell | |
| 2010/0306509 A1 * | 12/2010 | Day et al. | 712/217 |
| 2010/0325395 A1 | 12/2010 | Burger et al. | |
| 2010/0332804 A1 * | 12/2010 | Golla et al. | 712/214 |
| 2010/0332806 A1 * | 12/2010 | Golla et al. | 712/216 |
| 2011/0143811 A1 | 6/2011 | Rodriguez | |
| 2011/0153986 A1 | 6/2011 | Alexander et al. | |
| 2012/0150829 A1 * | 6/2012 | Bourbonnais et al. | 707/703 |
| 2012/0311273 A1 * | 12/2012 | Marathe et al. | 711/151 |
| 2013/0297912 A1 * | 11/2013 | Tran et al. | 712/208 |
| 2014/0173342 A1 * | 6/2014 | Kaushikkar et al. | 714/30 |
| 2014/0181419 A1 * | 6/2014 | Saund et al. | 711/146 |
| 2014/0181824 A1 * | 6/2014 | Saund et al. | 718/102 |
| 2014/0189411 A1 * | 7/2014 | Kanchana et al. | 713/324 |
| 2014/0195740 A1 * | 7/2014 | Saund et al. | 711/141 |

OTHER PUBLICATIONS

International Search Report and Written Opinion in application No. PCT/US2013/037809 mailed Sep. 10, 2013 pp. 1-16.

Extended Search Report in EP Application No. 13165284.4-1957, Sep. 30, 2013, pp. 1-9.

International Search Report and Written Opinion in application No. PCT/US2013/041852 mailed Sep. 30, 2013 pp. 1-14.

P.A. Semi, "The PWRficient Processor Family," pp. 1-31, Oct. 2005.

Soner Önder and Rajiv Gupta. "Load and Store Reuse Using Register File Contents." Jun. 2001. ACM. ICS '01. pp. 289-302.

Ken Shepard. "PCI overview." 2004. http://www.cisl.columbia.edu/courses/spring-2004/ee4340/handouts/pci.pdf.

Hynix. "SDRAM Device Operation." Sep. 2003. http://www.skhynix.com/inc/pdfDownload.jsp?path=/datasheet!Timing_Device/SDRAM_Deviceoperation_Rev1.2.pdf.Rev 1.1.

John Paul Shen and Mikko H. Lipasti. Modern Processor Design. Oct. 2005. McGraw Hill. 1st ed. pp. 181-186 and 203-206.

* cited by examiner

CROSS DEPENDENCY CHECKING LOGIC

BACKGROUND

1. Field of the Invention

The present invention relates generally to the field of computer systems, and in particular to methods and mechanisms for maintaining order among memory transactions.

2. Description of the Related Art

A system on chip (SoC) often includes multiple input/output (I/O) devices and a processor sharing one or more memory devices via a memory controller. Many different agents may generate memory transactions and convey these memory transactions to the memory controller. Often, a coherence point is used to maintain the ordering and coherence of these memory transactions within the SoC.

Transactions received by a coherence point may include a request address and in some cases, a victim address. If multiple transactions received by the coherence point target the same address, then these transactions should be completed in the order in which they were received by the coherence point. However, the coherence point may store the transactions in a queue which is not a first-in-first-out (FIFO) queue, and so the order of entries in the queue is not an indication of order.

SUMMARY

Systems and methods for managing transactions with address dependencies within a coherence point are contemplated.

A system on chip (SoC) may include a processor complex, a memory controller, a coherence point, and a switch fabric. The coherence point may include one or more current transaction tables (CTTs), and each CTT may include an input request queue (IRQ) for storing transactions received from the switch fabric. Each entry in the IRQ may store attributes associated with a corresponding transaction, including a request address field. The CTT may also include a victim address queue for storing victim addresses associated with the transactions stored in the entries of the IRQ. Each entry of the IRQ may also include a head pointer field which points to a separate entry that the original entry is dependent upon. If an entry is the head of the linked-list, than the head-pointer of this entry references itself. Also, if a transaction is not dependent on any other transactions and thus is not part of a linked-list, the head pointer of the corresponding entry for this transaction will point to itself.

The coherence point may include logic for determining if a newly received transaction is dependent on any of the outstanding transactions with entries in the CTT. In one embodiment, the newly received transaction may have a request address field and a victim address field. The dependency checking logic may determine if the request address or the victim address match any of the request addresses or victim addresses for currently outstanding transactions.

If the new transaction is dependent on any existing transactions, then the new transaction may be linked to the existing transaction(s) using a linked-list structure. The linked-list structure may be utilized to ensure that the dependent transactions are allowed to proceed in the order in which they were received by the coherence point. If the new transaction is dependent on multiple transactions, then the dependency checking logic may identify the tail of the linked-list and then the new transaction may point to the current tail of the linked-list. Then, the new transaction will become the new tail of the linked-list. When the transaction which is the current head of the linked-list is completed, then the next transaction in the linked-list may be made the new head of the linked-list. This transaction may have its head-pointer modified so that it points to itself. Then, this transaction may be allowed to proceed.

The coherence point may also include a level two (L2) duplicate tag unit, which stores duplicate tags from the L2 cache(s) in the processor complex. When a new transaction is determined to be dependent on one or more outstanding transactions, the data from the new transaction may be stored in the CTT and prevented from accessing the L2 duplicate tag unit until all other earlier transactions to the same address have been completed in the coherence point.

When the transaction which is the head of the linked-list is completed and exits the coherence point, then the next transaction in the linked-list may be made the new head of the linked-list. This transaction may have its head-pointer modified so that it points to itself. Then, this transaction may be allowed to proceed to check the L2 duplicate tag unit and then on to its intended destination.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising a coherence point . . ." Such a claim does not foreclose the apparatus from including additional components (e.g., a processor complex, a memory controller, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a queue having 64 entries, the terms "first" and "second" entries can be used to refer to any two of the 64 entries.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 1:
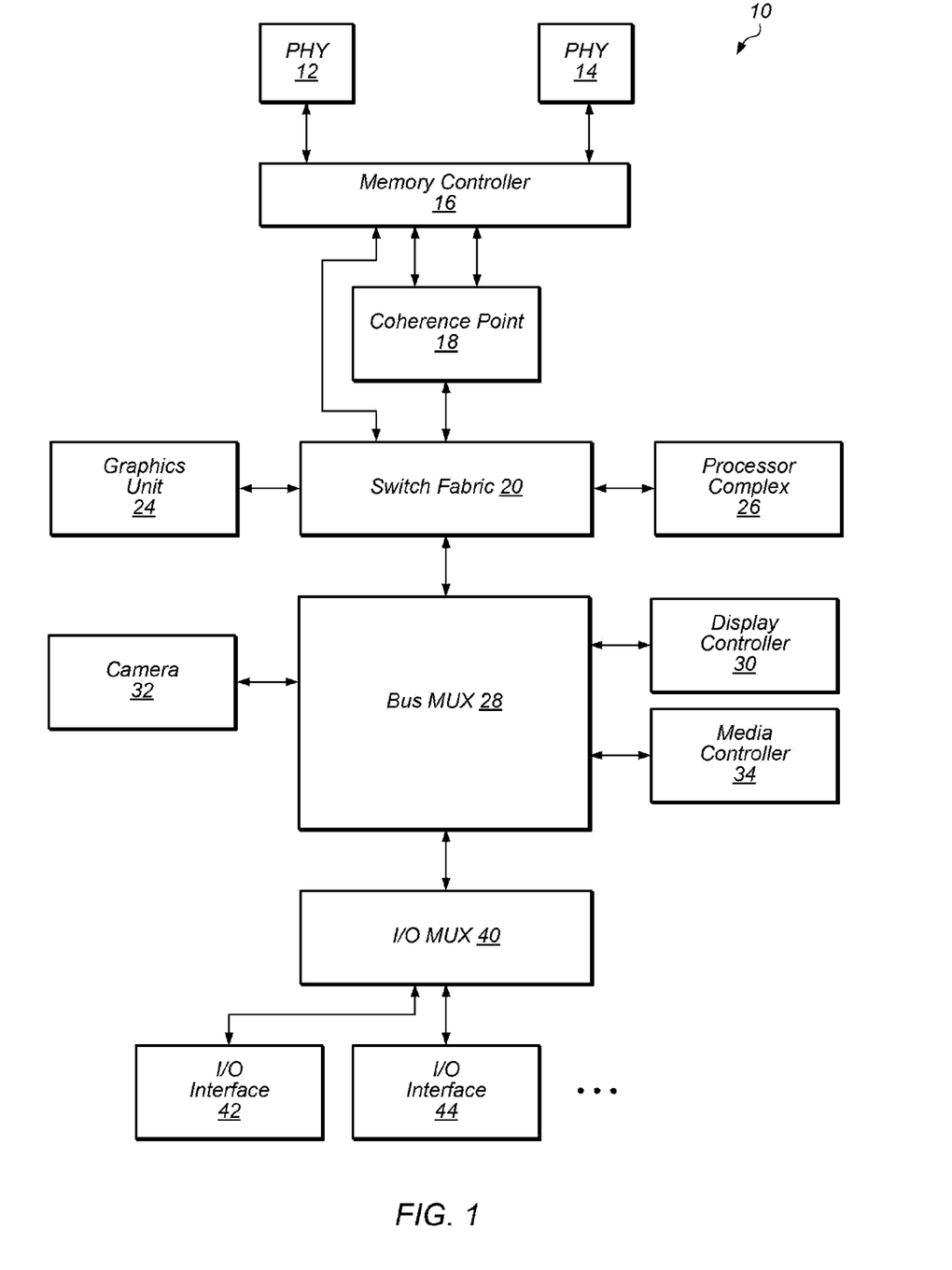
FIG. 1 illustrates a block diagram illustrating one embodiment of a portion of an integrated circuit (IC).

Referring now to FIG. 1, a block diagram illustrating one embodiment of a portion of an integrated circuit (IC) is shown. In the illustrated embodiment, IC 10 includes processor complex 26, coherence point 18, switch fabric 20, graphics unit 24, bus mux 28, display controller 30, media controller 34, camera 32, input/output (I/O) mux 40, I/O interfaces 42 and 44, memory controller 16, and memory physical interface circuits (PHYs) 12 and 14. It is noted that IC 10 may also include many other components not shown in FIG. 1 and/or omit one or more of the components shown. In various embodiments, IC 10 may also be referred to as a system on chip (SoC), an application specific integrated circuit (ASIC), or an apparatus. Clock sources, such as phase lock loops (PLLs), and power sources are not shown for ease of illustration.

Components shown within IC 10 may be coupled to each other using any suitable bus and/or interface mechanism. In some embodiments, these components may be connected using ARM Holdings' Advanced Microcontroller Bus Architecture (AMBA®) protocol or any other suitable on-chip interconnect specification for the connection and management of logic blocks. Examples of AMBA® buses and/or interfaces may include Advanced eXtensible Interface (AXI), Advanced High-performance Bus (AHB), Advanced System Bus (ASB), Advanced Peripheral Bus (APB), Advanced Trace Bus (ATB), etc. Other types of bus and interface mechanisms, such as specialty or proprietary interfaces with custom protocols, may also be utilized to provide connections between any of the various components of IC 10.

Processor complex 26 may include any number of central processing units (CPUs) (not shown), a supporting cache hierarchy including a level two (L2) cache (not shown), and multiple other components and logic. The CPU(s) of processor complex 26 may include circuitry to execute instructions defined in an instruction set architecture. Specifically, one or more programs comprising the instructions may be executed by the CPU(s). Any instruction set architecture may be implemented in various embodiments. For example, in one embodiment, the ARM™ instruction set architecture (ISA) may be implemented. The ARM instruction set may include 16-bit (or Thumb) and 32-bit instructions. Other exemplary ISA's may include the PowerPC™ instruction set, the MIPS™ instruction set, the SPARC™ instruction set, the x86 instruction set (also referred to as IA-32), the IA-64 instruction set, etc.

In various embodiments, coherence point 18, switch fabric 20, bus mux 28, and I/O mux 40 may constitute a communication fabric (or fabric) for providing a top-level interconnect for IC 10. In various embodiments, different types of traffic may flow independently through the fabric. The independent flow may be accomplished by allowing a single physical fabric bus to include a number of overlaying virtual channels, or dedicated source and destination buffers, each carrying a different type of traffic. Each channel may be independently flow controlled with no dependence between transactions in different channels. In other embodiments, the fabric shown in FIG. 1 may include one or more other units, two or more units may be combined into a single unit, and/or one or more units may be omitted.

Coherence point 18 may be configured to act as a gateway between the coherent and non-coherent domains in IC 10. Coherence point 18 may be the location in IC 10 where memory operations become globally visible. Coherence point 18 may also include L2 duplicate tags (not shown), which are tags from the L2 cache (in processor complex 26) for all coherent agents in IC 10 and which may be snooped by coherence point 18 for coherency operations. Coherence point 18 may also include additional logic (e.g., coherence control unit, memory interface unit, current transaction table, dependency logic unit) not shown in FIG. 1. For example, in various embodiments, coherence point 18 may include cache coherency logic employing a cache coherency protocol to ensure data accessed by each agent is kept up to date. An example of a cache coherency protocol includes the MOESI protocol with the Modified (M), Owned (O), Exclusive (E), Shared (S), and Invalid (I) states. Coherence point 18 may be coupled to switch fabric 20, and coherence point 18 may be coupled to other devices of IC 10 via switch fabric 20. Switch fabric 20 may be used to aggregate traffic from multiple devices within IC 10. In some embodiments, coherence point 18 and switch fabric 20 may be integrated within a single structure which may be referred to as a coherent switch.

Coherence point 18 may allow memory access requests from any requestor in IC 10 to snoop the cache hierarchy of processor complex 26. Thus, data produced by the CPUs of processor complex 26 may not be explicitly flushed for the data to be visible to the other devices and agents of IC 10. If the most recent copy of data is present in the cache hierarchy, then read requests may receive the most recent copy from the cache hierarchy. For write requests, merging may be performed for a cache line present in the cache hierarchy for any requestor in IC 10.

Bus mux 28 is coupled to memory via switch fabric 20, and bus mux 28 is also coupled to display controller 30, media controller 34, and camera 32. Bus mux 28 may also be referred to as an IC mux or SoC mux. In other embodiments, bus mux 28 may also be coupled to other devices (e.g., flash controller) not shown in FIG. 1. Bus mux 28 is also coupled to I/O mux 40, which is coupled to I/O interfaces 42 and 44.

I/O interfaces 42 and 44 are representative of any number of I/O interfaces or devices connected to I/O mux 40. I/O interfaces 42 and 44 may provide interfaces to any type of peripheral device implementing any hardware functionality included in the system. For example, I/O interfaces 42 and 44 may connect to audio peripherals such as microphones, speakers, interfaces to microphones and speakers, audio processors, digital signal processors, mixers, etc. Other I/O devices may include interface controllers for various interfaces external to IC 10, including interfaces such as Universal Serial Bus (USB), peripheral component interconnect (PCI) including PCI Express (PCIe), serial and parallel ports, general-purpose I/O (GPIO), a universal asynchronous receiver/transmitter (uART), a FireWire interface, an Ethernet interface, an analog-to-digital converter (ADC), a DAC, and so forth. Other I/O devices may also include networking peripherals such as media access controllers (MACs).

IC 10 may group processing blocks associated with non-real-time memory performance, such as the media controller 34, for image scaling, rotating, and color space conversion, accelerated video decoding for encoded movies, audio processing and so forth. Camera 32 and media controller 34 may include analog and digital encoders, decoders, and other signal processing blocks. In other embodiments, the IC 10 may include other types of processing blocks in addition to or in place of the blocks shown.

Memory controller 16 may include one or more memory caches (not shown). The memory caches may be used to reduce the demands on memory bandwidth and to reduce power consumption. The allocation policy for the memory caches may be programmable. Memory controller 16 may include any number of memory ports and may include circuitry configured to interface to memory. For example, memory controller 16 may be configured to interface to dynamic random access memory (DRAM) such as synchronous DRAM (SDRAM) (including mobile versions of the SDRAMs such as mDDR3, etc., and/or low power versions of the SDRAMs such as LPDDR2, etc.), RAMBUS DRAM (RDRAM), double data rate (DDR) SDRAM, DDR2 SDRAM, Rambus DRAM (RDRAM), static RAM (SRAM), GDDR4 (Graphics Double Data Rate, version 4) SDRAM, GDDR5 (Graphics Double Data Rate, version 5) SDRAM, etc. Memory controller 16 may also be coupled to memory physical interface circuits (PHYs) 12 and 14. Memory PHYs 12 and 14 are representative of any number of memory PHYs which may be coupled to memory controller 16. Memory PHYs 12 and 14 may be configured to interface to memory devices (not shown). Memory PHYs 12 and 14 may handle the low-level physical interface to the memory devices. For example, the memory PHYs 12 and 14 may be responsible for the timing of the signals, for proper clocking to synchronous DRAM memory, etc.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown. In addition, in other embodiments, the connections between components of IC 10 may differ from those shown in FIG. 1. For example, direct connections between components may be used for components that are not directly connected in FIG. 1, and components with direct connections in FIG. 1 may instead connect via one or more other components.

Figure 2:
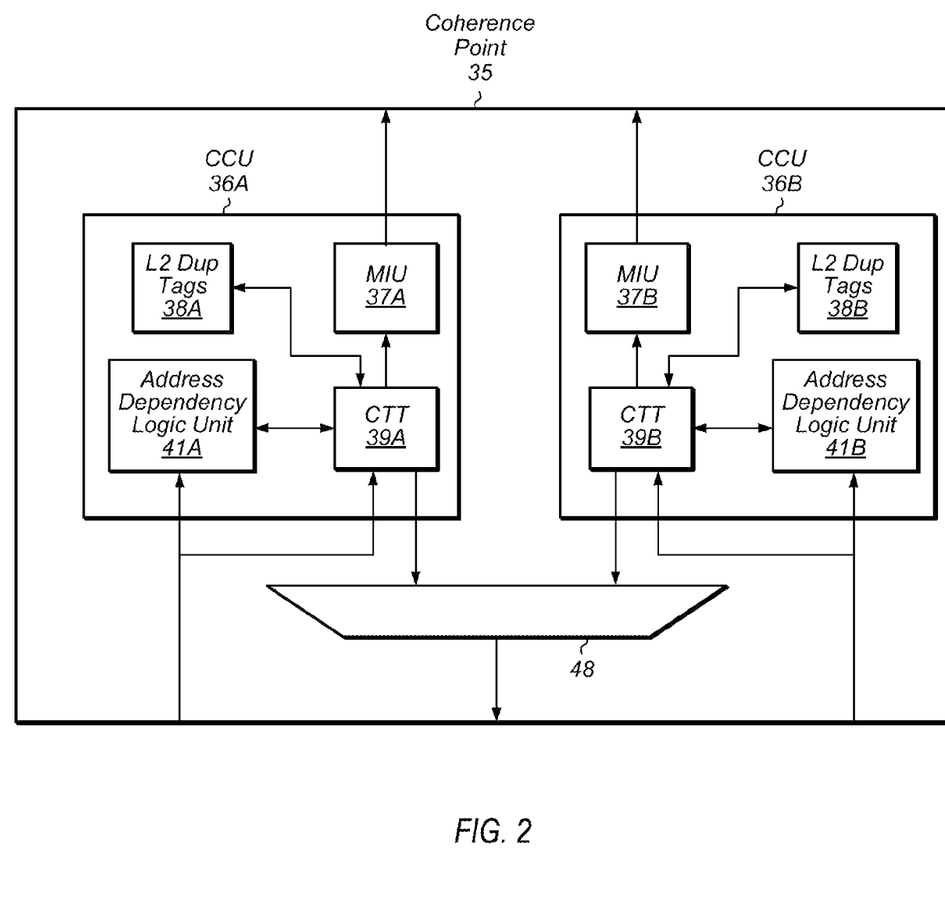
FIG. 2 is a block diagram of one embodiment of a coherence point.

Turning now to FIG. 2, a block diagram of one embodiment of a coherence point is shown. Coherence point 35 may include two separate coherence control units (CCUs) 36A and 36B, which may be referred to as left and right channels, respectively. It is noted that in other embodiments, coherence point 35 may have other numbers of CCUs (e.g., 1, 4, 8). Coherence point 35 may also include demux 48 for sending traffic to a switch fabric (not shown) from CCUs 36A and 36B. It is noted that coherence point 35 may also include other logic and units not shown in FIG. 2 to avoid obscuring the figure.

CCUs 36A and 36B may include address dependency logic units 41A and 41B, respectively. Address dependency logic units 41A and 41B may be configured to determine if a newly received transaction has an address dependency on one or more existing transactions. CCU 36A and 36B may also include L2 duplicate tags 38A and 38B, respectively. Each L2 duplicate tags unit 38 may include duplicate tags from the L2 cache(s) in the CPU(s) of the processor complex. CCU 36A and 36B may also include current transaction tables (CTTs) 39A and 39B, respectively. Each CTT 39 may store information associated with the outstanding in-flight transactions that have been received by coherence point 35 but have not yet been completed and removed from their corresponding CTT 39. It is noted that the term "transaction" may be used to refer to a "memory transaction", "input/output (I/O) transaction", or other type of transaction. Generally speaking, a transaction may comprise a memory request, and the term "memory request" is not limited to requests that are ultimately responded to by memory, but can also include requests that are satisfied by a cache. It is noted that the terms "memory request", "transaction", and "memory operation" may be used interchangeably throughout this disclosure.

Although each CTT 39 is shown as a single block, each CTT 39 may include multiple structures, such as an input request queue (IRQ), victim address queue, victim data queue, CTT entry attribute queue, and one or more other data structures. CTT 39A and 39B may be coupled to memory interface units (MIUs) 37A and 37B, respectively. Each MIU 37 may be configured to provide the interface from coherence point 35 to a memory controller (not shown).

Each address dependency logic unit 41 may be configured to check for an address dependency for a newly received transaction. Each newly received transaction may include a request address and optionally a victim address, and unit 41 may search for matches with the request address and for matches with the victim address (if applicable). When the L2 cache in the processor complex allocates a cache line in a given index and way, if that location already has valid data, then the L2 cache may evict that data so the new cache line can be stored in that location. The data that is evicted is called a victim, and the address of this data is referred to as the "victim address". A given transaction can arrive in the coherence point with a request address and a victim address. The request address refers to the address of the data that the transaction is requesting, and the victim address indicates the address of the data that the transaction is returning to memory, and these addresses are cache line aliases.

When a new transaction is received by either CCU 36A or 36B, the corresponding unit 41A or 41B may search the entries of the corresponding CTT 39A and 39B for other transactions with the same address in a request address field or a victim address field as either the request address or the victim address of the new transaction. This search may include four separate searches of the corresponding CTT 39. The request address may be searched against the request address field and the victim address field of the CTT 39 entries, and the victim address of the new transaction may also be searched against the request address field and the victim address field of the CTT 39 entries.

The new transaction may be routed to one of the CCUs 36A or 36B based on an address hash function that is performed on the request address of the new transaction. In one embodiment, this address hash function may be performed in the switch fabric. After the new transaction is received by the appropriate CCU 36, an available entry may be allocated for the new transaction in the corresponding CTT 39A or 39B. If a single matching entry is found with the same request or victim address as either of the new transaction's addresses, then a linked list may be created to link together the existing entry with the new entry corresponding to the new transaction. If multiple matching entries are found with the same address as the new transaction, then the new entry may be added to the tail of the existing linked list.

By creating a linked list for transactions with the same address, the coherence point can ensure the correct order is maintained for these transactions and that a shared address is locked down and prevented from being improperly accessed by multiple in-flight transactions. The coherence point may be configured to block the next transaction in the linked list until the previous transaction in the linked list has been completed in coherence point 35. While a transaction with an address dependency is waiting for the previous transaction to be completed, the transaction may be prevented from accessing the corresponding L2 duplicate tags 38. When a transaction at the head of the linked list has been completed, coherence point 35 may be configured to unblock the next transaction in the linked list.

Figure 3:
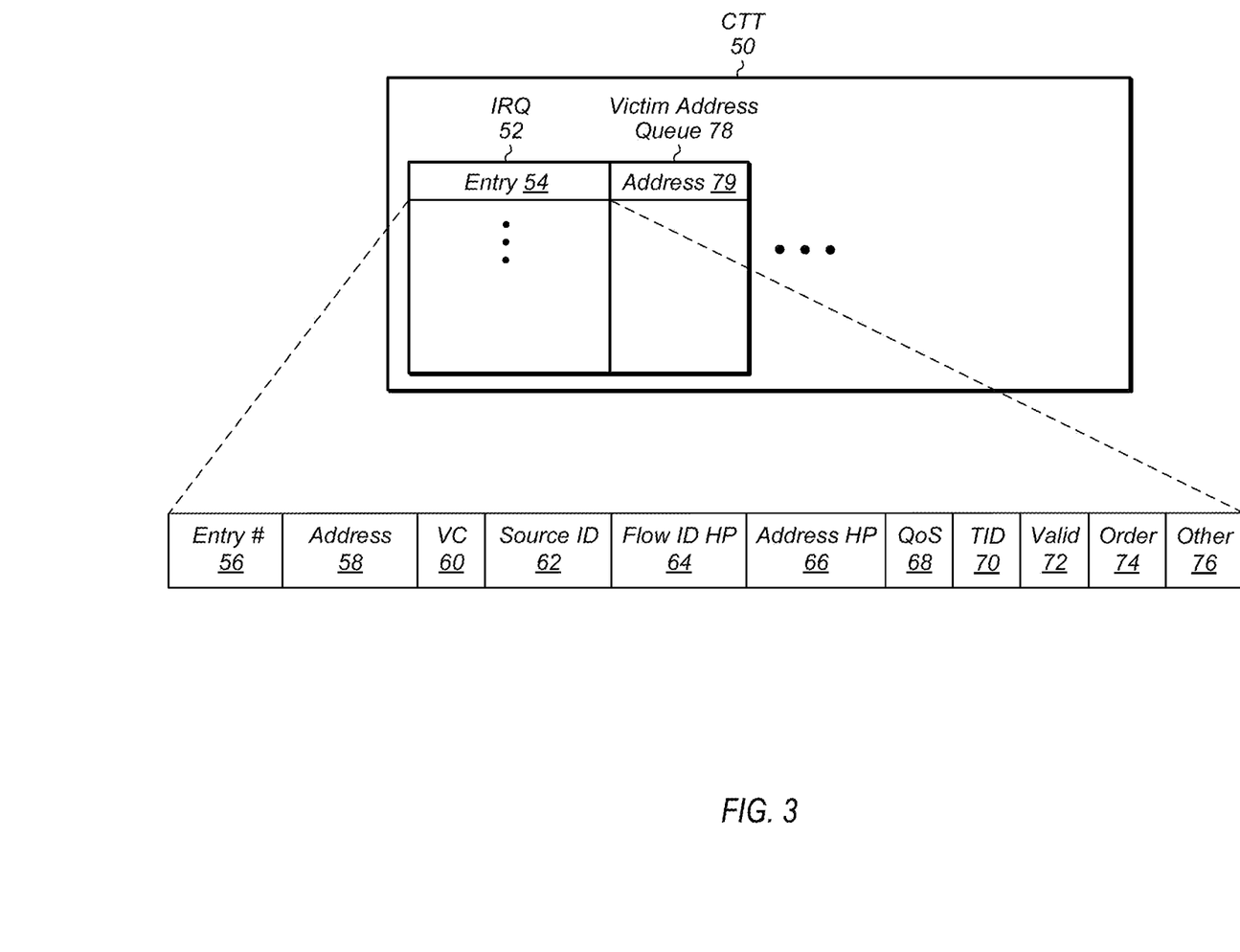
FIG. 3 is a block diagram illustrating one embodiment of an input request queue entry.

Referring now to FIG. 3, a block diagram illustrating one embodiment of an input request queue (IRQ) entry is shown. Current transaction table (CTT) 50 may include multiple queues, such as IRQ 52, victim address queue 78, and other queues, tables, and/or other logic structures. CTT 50 may be located within a coherence point, such as coherence point 35 of FIG. 2. IRQ 52 is representative of any size of queue, with the capacity for storing any number of transactions. In one embodiment, IRQ 52 may store 64 entries, while in other embodiments, IRQ 52 may include other numbers of entries. Victim address queue 78 may store the same number of entries as IRQ 52.

Each entry of IRQ 52 may include multiple attributes associated with a transaction that has been received by the coherence point. Entry 54 is expanded in FIG. 3 to show the attributes that may be stored in a typical entry of IRQ 52. For example, in one embodiment, entry 54 may include an entry number 56, request address 58, virtual channel (VC) 60, source ID 62, flow ID dependency head pointer 64, address dependency head pointer 66, quality of service (QoS) indicator 68, transaction ID (TID) 70, valid indicator 72, ordering attribute 74, and other attribute 76, which is representative of any number of other attributes. The ordering attribute 74 may refer to the device ordered attribute, relaxed ordered attribute, or other types of ordering attributes. The victim address 79 may be stored in victim address queue 78 in an entry in queue 78 corresponding to entry 54 of IRQ 52. Alternatively, in another embodiment, victim address 79 may be stored within entry 54 of IRQ 52. In other embodiments, entries of IRQ 52 may include various other information and attributes associated with the corresponding transactions and/or omit some of the attributes shown in FIG. 3.

When any new transaction is received by the host coherence point, a search may be performed of IRQ 52 to see if the new transaction has an address dependency on any existing transactions. IRQ 52 and victim address queue 78 may be searched for existing entries to see if either the request address or the victim address of the new transaction matches any request addresses or victim addresses of existing entries. This may entail four separate searches of fields in CTT 50. First, the request address of the new transaction may be compared against the request address 54 field of IRQ 52. Next, the victim address of the new transaction may be compared against the request address 54 field of IRQ 52. Then, the request address of the new transaction may be compared against the victim address 79 field of victim address queue 78. Finally, the victim address of the new transaction may be compared against the victim address 79 field of victim address queue 78. In addition, in response to a new transaction being received, an available entry may be allocated to store attributes associated with the new transaction.

If no matches are found between the new transaction and the existing entries in IRQ 52 and victim address queue 78 for the addresses of the new transaction, then the address head pointer 66 for the new transaction's entry in IRQ 52 may point to itself. If one match is found, then the address head pointer 66 for the new entry may point to this matching entry. If multiple matches are found, then the address head pointer 66 for the new entry may point to the entry which is the tail (i.e., most recently received transaction) of the multiple matching entries. If multiple matches are found for one of the addresses of the new transaction, then this means there is already a linked list for this particular address, and the tail of the linked list may be identified, and then the new entry for the new transaction may have its address head pointer 66 point to this tail entry of IRQ 52.

Figure 4:
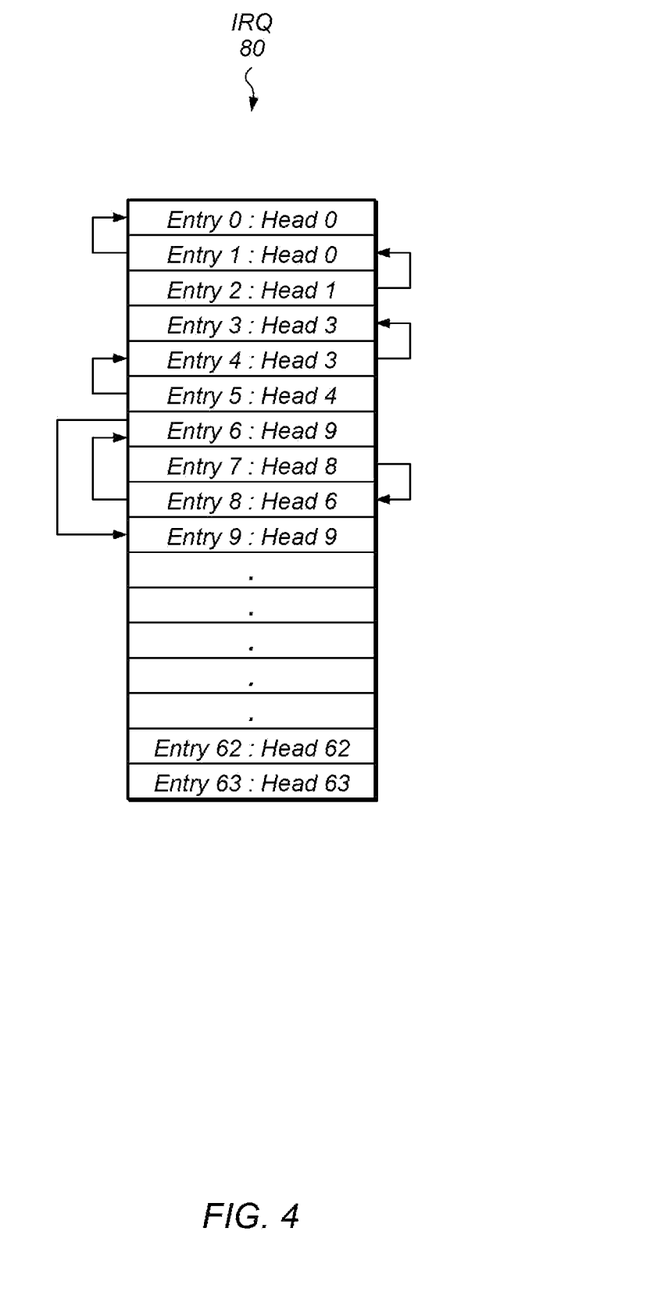
FIG. 4 is a block diagram of one embodiment of a linked-list structure.

Referring now to FIG. 4, one embodiment of a linked-list structure is shown. IRQ 80 is one example of an IRQ which utilizes a linked-list structure to manage dependencies between entries corresponding to outstanding transactions. The entries shown in FIG. 4 display the entry numbers and the address head pointer fields only, although the entries may include many other attributes which are not shown for ease of illustration. For example, the first entry "Entry 0: Head 0" indicates that this is entry number 0 and that the address head pointer references entry 0. Therefore, the transaction stored in this entry may be allowed to proceed when selected by the coherence point's arbiter.

It will be assumed for the purposes of this discussion that IRQ 80 has 64 entries numbered 0-63. However, in other embodiments, an IRQ may include other numbers of entries. Also, in other embodiments, the linked-list structure shown in FIG. 4 may be split up into two or more separate queues, but each entry may point to entries in the same queue or to entries in other queues. For example, a first queue may have 32 entries numbered from 0-31 and a second queue may have 32 entries numbered from 32-63. The head pointer in any entry may reference any entry numbered from 0-63, so that an entry in the first queue may reference an entry in the second queue and vice versa.

In one embodiment, the entries with the head pointers may be stored within an IRQ. In another embodiment, the entries with the head pointers may be located within another structure of the CTT. Alternatively, in a further embodiment, the head pointers forming the linked-list structure may be located within the host coherence point but external to the CTT.

As shown in FIG. 4, there are three different linked-lists that are stored in IRQ 80. Entries 0, 1, and 2 form a linked-list, with entry 2 pointing to entry 1 and entry 1 pointing to entry 0. Since entry 0 points to itself, it is the head of the list, while entry 2 is the tail of the list. A second linked-list stored in IRQ 80 includes entries 3, 4, and 5. Entry 5 points to entry 4 which points to entry 3. Entry 3 is the head of this linked-list since it points to itself and entry 5 is the tail of the list. A third list includes entries 6, 7, 8, and 9. Entry 7 points to entry 8, which points to entry 6, which points to entry 9. Entry 9 is the head of this linked-list and entry 7 is the tail of the list. For each of the linked-lists shown in IRQ 80, only the head of each linked-list may be allowed to proceed with coherence point processing and be sent on its path to its intended destination. The other transactions of the linked-list will be blocked until the transaction pointed to by their address head pointer field has been completed. Entries 62 and 63 are also shown in IRQ 80, and these entries correspond to transactions without an address dependency. At any given time, any number of entries in IRQ 80 may be without an address dependency.

Figure 5:
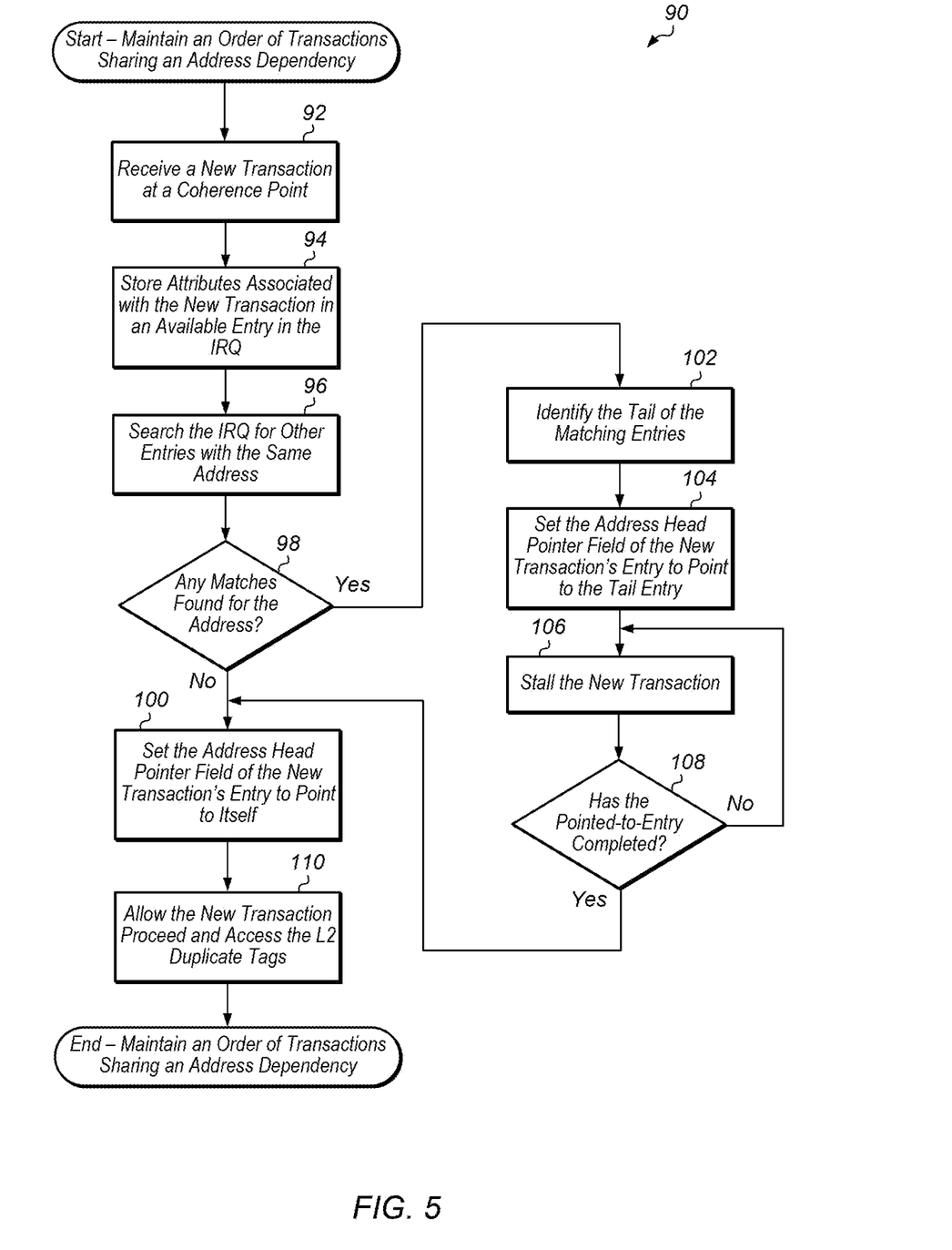
FIG. 5 is a generalized flow diagram illustrating one embodiment of a method for maintaining an order of transactions sharing an address dependency.

Referring now to FIG. 5, one embodiment of a method 90 for maintaining an order of transactions sharing an address dependency is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a new transaction may be received at a coherence point (block 92). Attributes associated with the new transaction may be stored in an available entry in the IRQ and victim address queue (block 94). The attributes that are stored in the available entry may include a request address, victim address, a virtual channel (VC), a source ID, QoS level, transaction ID, and one or more other attributes. In one embodiment, the IRQ may not be a first-in, first-out (FIFO) queue. Therefore, to maintain an order of transactions that are accessing the same address in accordance to the order in which they were received by the coherence point, a linked-list may be created within the IRQ for each group of transactions sharing an address dependency.

Next, the IRQ may be searched for other entries with the same request address or victim address as the new transaction's request address and victim address (block 96). If the new transaction does not have a victim address, then only the request address may be used for searching for matching entries. It is noted that blocks 94 and 96 may be performed concurrently, or alternatively, block 96 may be performed prior to block 94. If a match is found with the request address or victim address of one or more other entries (conditional block 98, "yes" leg), the tail of the matching entries may be identified (block 102). If only a single match is found, then this matching entry will be considered the tail for the purposes of this discussion. If no matches are found with the request address or victim address in any of the IRQ entries (conditional block 98, "no" leg), then the head pointer of the new entry for the new transaction may point to itself (block 100).

After the tail entry is identified in block 102, the head pointer of the new entry for the new transaction may point to the tail entry (block 104). Then, the coherence point may stall the new transaction for as long as its head pointer points to this entry (block 106). Next, if the coherence point determines that the transaction corresponding to the entry pointed to by the new transaction's head pointer has been completed within the coherence point (conditional block 108, "yes" leg), then the head pointer may be set to point to itself (block 100). In one embodiment, it may be determined that a transaction has been completed in the coherence point if all processing related to the transaction, including coherence processing, request processing, and response processing, is finished and the transaction is ready to be removed from the IRQ. If the coherence point determines that the transaction corresponding to the entry pointed to by the new transaction's head pointer has not yet been completed (conditional block 108, "no" leg), then method 90 may return to block 106 and stall the new transaction. After block 102, the coherence point may unblock the new transaction and allow the new transaction to access the L2 duplicate tags and then continue with further processing (block 110). After block 110, method 90 may end.

Figure 6:
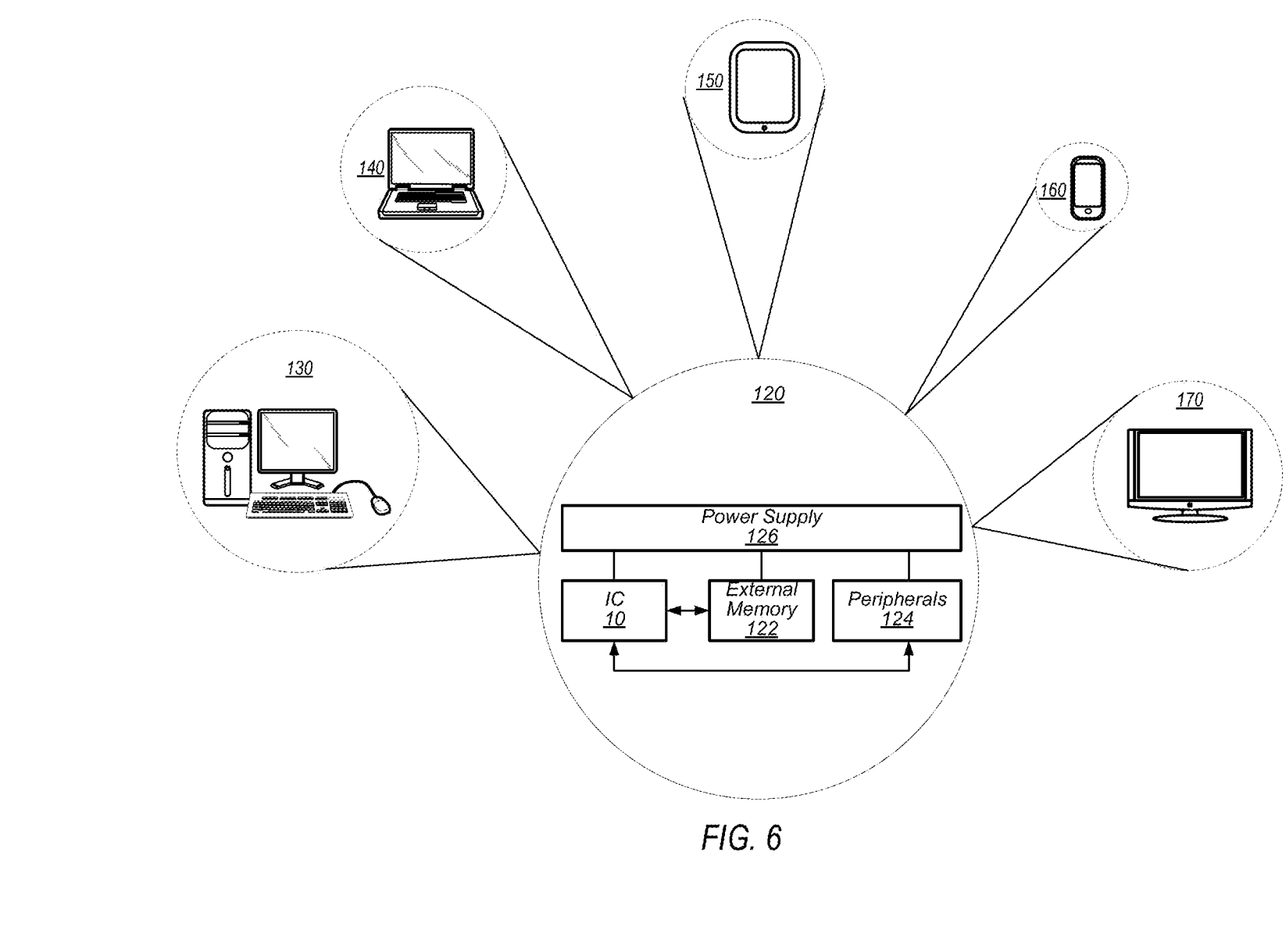
FIG. 6 is a block diagram of one embodiment of a system.

Turning now to FIG. 6, a block diagram of one embodiment of a system 120 is shown. As shown, system 120 may represent chip, circuitry, components, etc., of a desktop computer 130, laptop computer 140, tablet computer 150, cell phone 160, television 170 (or set top box configured to be coupled to a television), or otherwise. In the illustrated embodiment, the system 120 includes at least one instance of IC 10 (of FIG. 1) coupled to an external memory 122.

IC 10 is coupled to one or more peripherals 124 and the external memory 122. A power supply 126 is also provided which supplies the supply voltages to IC 10 as well as one or more supply voltages to the memory 122 and/or the peripherals 124. In various embodiments, power supply 126 may represent a battery (e.g., a rechargeable battery in a smart phone, laptop or tablet computer). In some embodiments, more than one instance of IC 10 may be included (and more than one external memory 122 may be included as well).

The memory 122 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 10 in a chip-on-chip configuration, a package-on-package configuration, or a multi-chip module configuration.

The peripherals 124 may include any desired circuitry, depending on the type of system 120. For example, in one embodiment, peripherals 124 may include devices for various types of wireless communication, such as wifi, Bluetooth, cellular, global positioning system, etc. The peripherals 124 may also include additional storage, including RAM storage, solid state storage, or disk storage. The peripherals 124 may include user interface devices such as a display screen, including touch display screens or multitouch display screens, keyboard or other input devices, microphones, speakers, etc.

Figure 7:
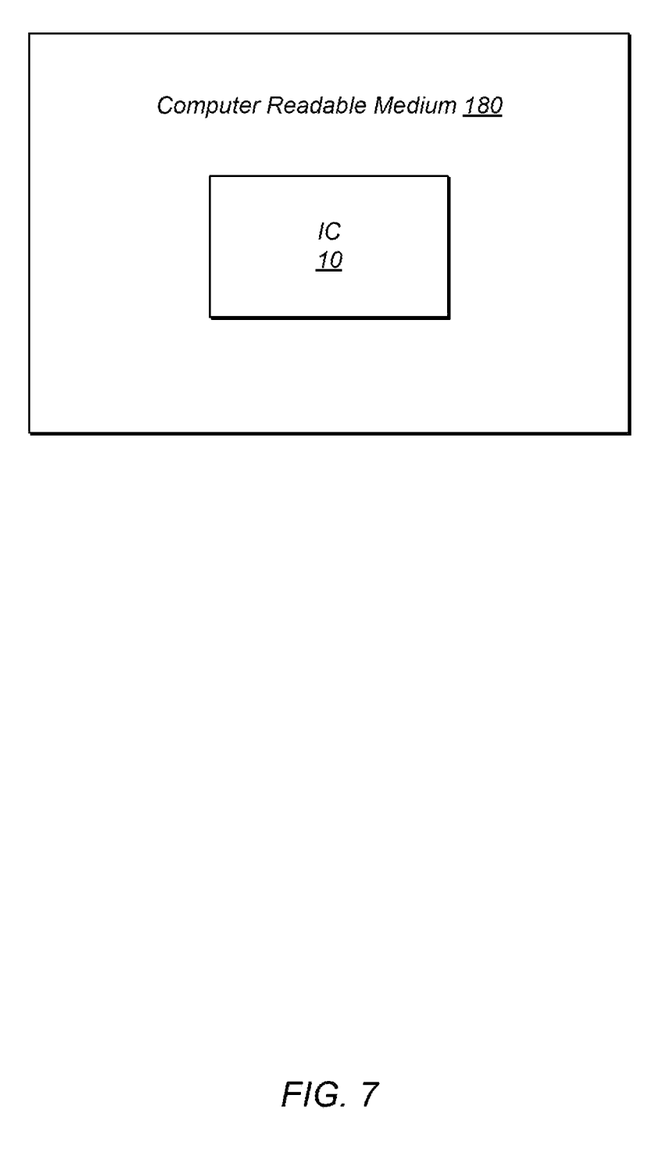
FIG. 7 is a block diagram of one embodiment of a computer readable medium.

Referring now to FIG. 7, one embodiment of a block diagram of a computer readable medium 180 including one or more data structures representative of the circuitry included in IC 10 (of FIG. 1) is shown. Generally speaking, computer readable medium 180 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 180 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 180 may be the netlist(s) (with or without the synthesis library) or the data set(s), as desired. In yet another alternative, the data structures may comprise the output of a schematic program, or netlist(s) or data set(s) derived therefrom. While computer readable medium 180 includes a representation of IC 10, other embodiments may include a representation of any portion or combination of portions of IC 10 (e.g., coherence point 18).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A coherence point comprising:
a queue configured to store a plurality of outstanding transactions;
a level two (L2) duplicate tag unit; and
a dependency logic unit coupled to the queue, wherein the dependency logic unit comprises circuitry configured to:
search the queue for outstanding transactions that reference a first address responsive to receiving a first transaction at the coherence point, wherein the first transaction includes a request address equal to the first address; and
mark the first transaction as dependent on a second transaction responsive to determining the second transaction is a most recently received transaction in the queue that references the first address;
wherein the coherence point is configured to prevent the first transaction from searching the L2 duplicate tags until the second transaction is completed.

2. The coherence point as recited in claim 1, wherein the queue is searched for outstanding transactions that reference the first address in either a request address field or a victim address field.

3. The coherence point as recited in claim 2, wherein the coherence point is configured to stall the first transaction until the second transaction is completed in the coherence point.

4. The coherence point as recited in claim 3, wherein marking the first transaction as dependent on the second transaction comprises setting a head pointer field of the first transaction to point to the second transaction.

5. The coherence point as recited in claim 4, wherein the coherence point is configured to store attributes associated with the first transaction in a first entry of the queue, and wherein the first entry comprises the head pointer field.

6. The coherence point as recited in claim 5, wherein the coherence point is configured to set the head pointer field of the first entry to point to itself responsive to determining the second transaction has been completed in the coherence point.

7. A method comprising:
receiving a first transaction with a first request address and a first victim address at a coherence point, wherein the coherence point includes level two (L2) duplicate tags;
searching a queue for any transactions with the first request address or the first victim address in any address field, wherein the queue is configured to store entries corresponding to a plurality of outstanding transactions;
identifying a most recently received transaction in the queue that references either the first request address or the first victim address;
marking the first transaction as dependent on the most recently received transaction in the queue that references either the first request address or the first victim address;
stalling the first transaction until the most recently received transaction that references either the first request address or the first victim address is completed in the coherence point;
preventing the first transaction from searching the L2 duplicate tags until the most recently received transaction in the queue that references either the first request address or the first victim address is completed.

8. The method as recited in claim 7, further comprising storing attributes associated with the first transaction in a first entry of the queue.

9. The method as recited in claim 8, wherein the attributes comprise a head pointer field, and wherein marking the first transaction as dependent on the most recently received transaction in the queue that references either the first request address or the first victim address comprises setting the head pointer field of the first entry to point to an entry corresponding to the most recently received transaction in the queue that references either the first request address or the first victim address.

10. The method as recited in claim 9, further comprising setting the head pointer field of the first entry to point to itself responsive to determining the most recently received transaction in the queue that references either the first request address or the first victim address has been completed in the coherence point.

11. The method as recited in claim 10, further comprising allowing the first transaction to proceed responsive to determining the head pointer field of the first entry references itself.

12. A method comprising:
receiving a first transaction at a coherence point, wherein the first transaction references a first address;
searching a queue for any transactions that reference the first address, wherein the queue comprises a plurality of entries configured to store an outstanding transaction, and wherein each entry includes an address dependency head pointer field;
storing the first transaction in a first entry of the queue;
setting a first head pointer of the first entry to point to the first entry of the queue responsive to finding no transactions that reference the first address in the queue; and setting the first head pointer of the first entry to point to a second entry of the queue that stores a second transaction, responsive to determining the second transaction is a most recently received transaction in the queue that references the first address.

13. The method as recited in claim 12, further comprising stalling the first transaction responsive to determining the first head pointer points to the second transaction.

14. The method as recited in claim 13, further comprising allowing the first transaction to proceed responsive to determining the first head pointer points to the first entry.

15. The method as recited in claim 14, further comprising storing a plurality of attributes associated with the first transaction in a first entry of the queue.

16. The method as recited in claim 15, wherein the plurality of attributes comprise the first head pointer.

17. The method as recited in claim 16, further comprising setting the first head pointer to point to the first entry of the queue responsive to determining the second transaction has been completed in the coherence point.

18. An apparatus comprising a coherence point, wherein the coherence point comprises:
  a queue comprising a plurality of entries, wherein each entry is configured to store an outstanding transaction and includes an address dependency head pointer field; and
  an address dependency logic unit coupled to the queue;
  wherein the coherence point is configured to:
    search one or more address fields of each entry of the queue for matches to any of one or more first addresses, responsive to receiving a new transaction with the one or more first addresses;
    identify a most recently received transaction in the queue with an address field that matches any of the one or more first addresses;
    store the new transaction in a first entry of the queue;
    update a head pointer field of the first entry to point to a second entry of the queue, wherein the second entry stores the most recently received transaction in the queue with an address field that matches any of the one or more first addresses; and
    stall the new transaction until the most recently received transaction in the queue with an address field that matches any of the one or more addresses has been completed in the coherence point.

19. The apparatus as recited in claim 18, wherein the coherence point is further configured to allow the new transaction to proceed responsive to determining the most recently received transaction in the queue with an address field that matches any of the one or more addresses has been completed in the coherence point.

20. The apparatus as recited in claim 19, wherein the one or more first addresses comprise a first request address and a first victim address, and wherein the one or more address fields of each entry of the queue comprise a request address field and a victim address field.

21. The apparatus as recited in claim 20, wherein the coherence point is further configured to update the head pointer field of the first entry to point to itself responsive to determining the most recently received transaction in the queue with either a request address field or a victim address field that matches either the first request address or the first victim address has been completed.

* * * * *